United States Patent Office 3,463,318
Patented Aug. 26, 1969

3,463,318
CENTRIFUGING DEVICE FOR SEPARATING A MIXTURE INTO SOLIDS AND LIQUID
Alexander Lutter, Weissenau, Germany, assignor to Escher Wyss, Limited, Zurich, Switzerland, a corporation of Switzerland
Filed June 10, 1968, Ser. No. 735,713
Claims priority, application Switzerland, June 9, 1967, 8,197/67
Int. Cl. B04b 3/00; B01d 33/06, 19/00
U.S. Cl. 210—188    4 Claims

ABSTRACT OF THE DISCLOSURE

A centrifuging device for separating a mixture into solid matter and liquid, having a rotatable sieve drum through which said mixture flows; a collecting space for said solid matter being discharged at the rear edge of said drum; a collecting space for said liquid, surrounding said drum and axially subdivided by one or more partitions; a device for degasifying said liquid, connected to said liquid collecting space; one of said partitions extending, in the direction towards said degasifying device, to a point at which the excess pressure relatively to the pressure in said solid matter collecting space is practically equalised.

Background of the invention

In preferably continuously operating sieve centrifuges serving for the separation of a mixture into solid matter and liquid, the problem arises of removing the solid matter, projected over the rear edge of the centrifuge drum and separated to the greatest possible extent from the liquid, while preventing liquid from being able to pass over into the solid matter collecting space or solid matter into the liquid collecting space.

For solving this problem, it would be desirable in itself to close the solid matter collecting space hermetically from the liquid collecting space. In practice, however, this is impossible because the centrifuge drum, from which sealing must be effected, is rotating at a high speed of, for example, 30 to 60 m./sec., and under working conditions, no accurate true running of the drum can be achieved, this being due to unbalances which may be produced by even slight inequalities in the charge. It is therefore necessary to leave free, between the rotating centrifuge drum and the wall between liquid collecting housing and solid matter collecting housing, an annular gap having at least the magnitude of the maximum unbalance movements of the drum.

In machines constructed in accordance with the prior art, this annular gap is bridged over for example by a labyrinth seal. This solution, however, has the drawback that the labyrinth gaps very soon become blocked, which is more particularly furthered by the fact that the rotating centrifuge drum exercises a certain pumping effect, so that a higher pressure prevails in the liquid collecting space than in the solid matter collecting space. The resulting pressure drop causes the liquid, generally in the form of fine droplets, to tend to pass through the annular gap or labyrinth gaps into the solid matter collecting space, some of these droplets being precipitated in the gaps. More particularly when the liquid consists of solutions, separation of solid matter may then occur, resulting in blockages.

For this reason, attempts have already been made to produce at the point of the passage between solid matter collecting space and liquid collecting space a back-pressure for preventing the passage of liquid droplets, by the provision of fan blades on the periphery of the drum. These devices, however, are very expensive, inter alia because the larger drum diameter resulting at this place necessitates making the housing in two parts for assembly, and also necessitates strengthening the bearings considerably.

Another known step is to divide the liquid collecting housing into individual chambers, situated, in the direction of the drum axis, one after the other, by the provision of partitions. The partitions are intended to prevent centrifuged liquid from being engaged at once by the airflow in the vicinity of the drum surface and carried into the solid matter collecting space.

It is furthermore known to connect the liquid collecting space by a conduit to a hydrocyclone the purpose of which is to degasify the liquid and thus ensure quiet discharge of the liquid. Such a hydrocyclone, furthermore, also has a certain reaction on the flow conditions in the liquid collecting space, whereby the flow turbulence prevailing there is reduced. This, however, does not go so far as to prevent the passage of liquid through the annular gap into the solid matter collecting space.

There still remains the problem, therefore, of economically suppressing the passage of liquid into the annular gap or into the solid matter collecting space.

Summary of the invention

The object of this invention is to provide an economical means to suppress the passage of liquid through the annular gap between the liquid collecting space and the solids collecting space of a separatory centrifuge. Such a centrifuge includes a rotary sieve drum through which the mixture to be separated flows. There is a solids collecting space at the rear edge of the drum, and a collecting space for liquid surrounds the drum. A wall separates these two spaces and encircles the rear edge of the drum. A degasifying device is connected to receive the separated liquid. According to the invention, the liquid space is divided into axially spaced regions by a partition. This partition extends from the drum surface toward the degasifying device and defines, together with the separating wall, a conduit. The remainder of the liquid collecting space and the degasifying device cooperate to produce a pressure in that conduit, adjacent the gap, which is substantially equal to that in the solids collecting space.

By means of this step, it is possible practically to suppress the flow directed towards the annular gap between the sieve drum and the wall between the liquid collecting space and the solid matter collecting space, the effect being all the more complete, the more flow-favourable is the arrangement of the partition. Anything which prevents flow in the separated rear region must be avoided. This means, inter alia, that the spacing of the flow-guiding partition and wall must not be too small. Further, the surface roughness must be as small as possible and cross-sectional reductions and constrictions should be avoided as far as possible. It has been found particularly favourable if the connecting conduit between liquid collecting space and degasifying device is formed as a diffusor, and the partition is arranged at an always constant distance from the wall of the liquid collecting space. It has further been found favourable if the partition is taken directly up to the degasifying device. Experiments have shown that it is a question of the width of the separated rear region and that it is favourable if, at least at the centrifuge housing, the ratio of the width of the separated rear region to the width of the remaining region is in the range between 1:5 and 1:10.

Brief description of the drawing

The invention is represented with reference to an example in the drawings, in which.

Description of the preferred embodiment

Figure 1:
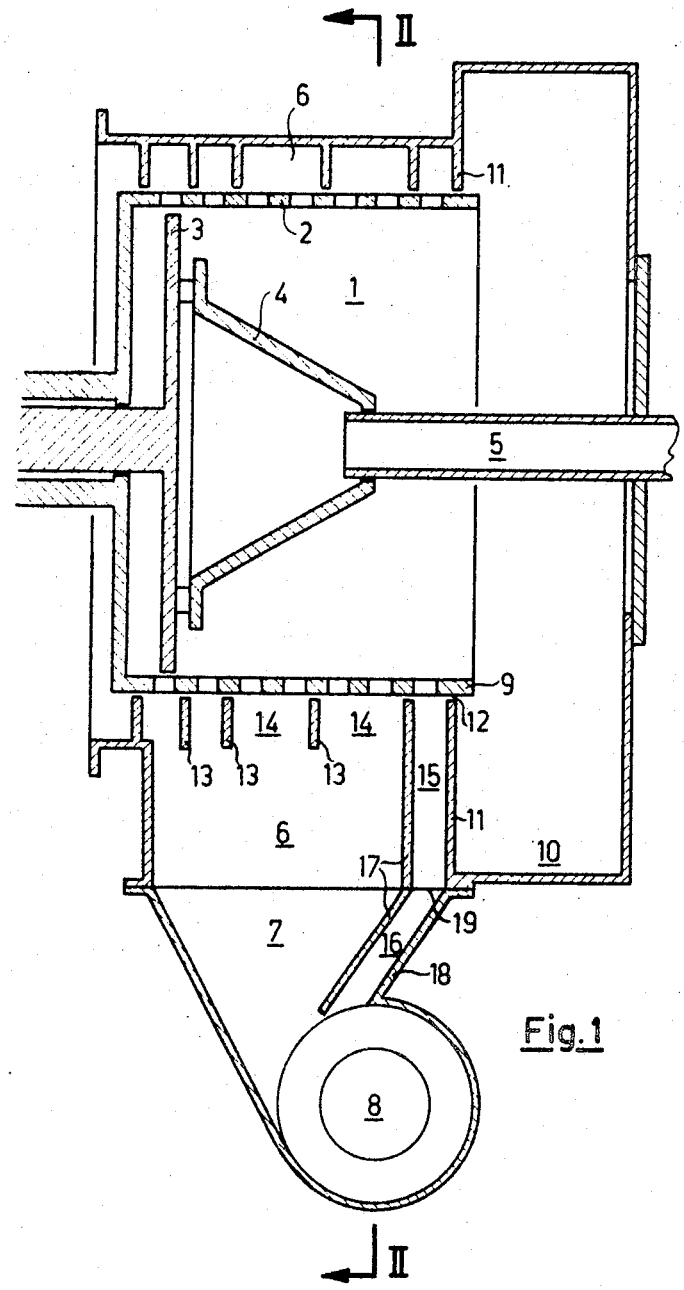
FIGURE 1 shows a horizontal axial section through one embodiment of the centrifuging device according to the invention.
Figure 2:
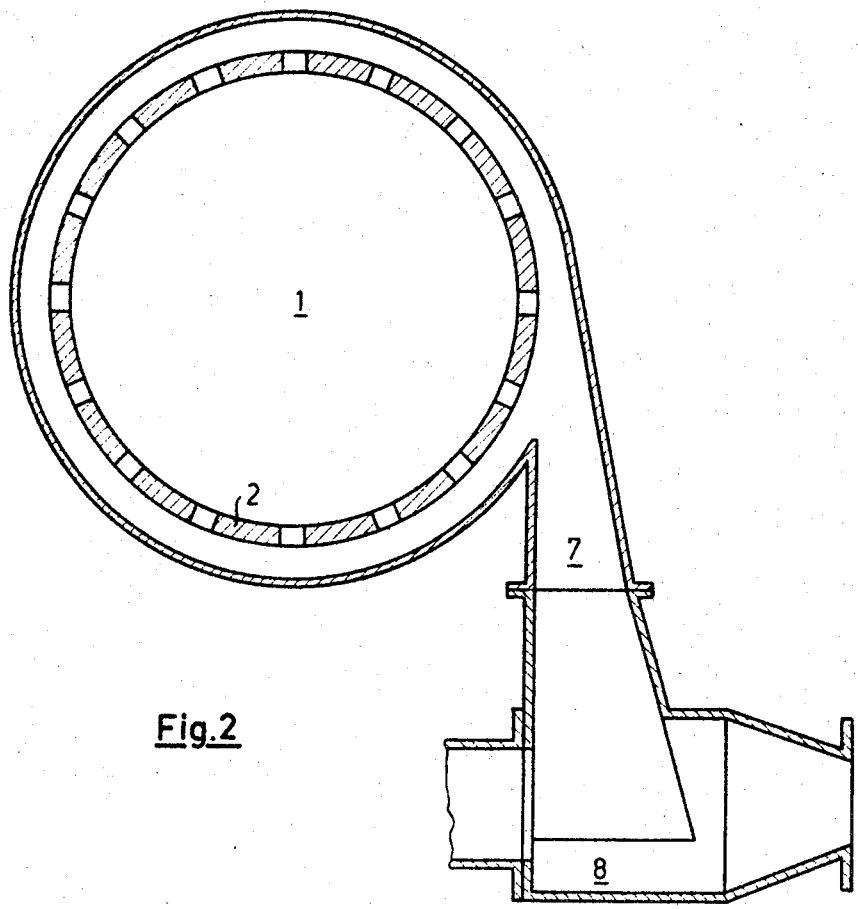
FIGURE 2 shows a vertical section on the line II—II in FIGURE 1.

In the drawings, at 1 is shown a pusher type centrifuge of known construction, having a rotatable sieve drum 2, i.e. a perforated drum, and a pusher plate 3 mounted therein, being reciprocatable in the axial direction of the sieve drum 2. The inlet funnel 4, to which the mixture to be centrifuged is supplied via the conduit 5, is rigidly connected to the pusher plate.

The sieve drum 2 is surrounded by the liquid collecting space 6, which in its turn is connected by a connecting conduit 7 to a degasifying device 8, constructed, in the embodiment shown, as a hydrocyclone.

At the rear edge 9 of the sieve drum 2 is the solid matter collecting space 10, separated from the liquid collecting space 6 by a wall 11. Between the wall 11 and the sieve drum 2 is an open annular gap 12, through which, in centrifuges constructed in accordance with the prior art, liquid can pass from the collecting space 6 to the collecting space 10.

The liquid collecting space 6 is subdivided in known manner into individual chambers 14, situated one after the other, by short partitions 13, extending close to the surface of the rotatable sieve drum 2. These partitions prevent the liquid issuing forwardly in a large quantity through the apertures of the sieve drum 2 from being forced to the rear towards the annular gap 12 and passing through the latter to the solid matter collecting space 10.

According to the invention, the region 15 of the liquid collecting space 6, which region faces the rear edge 9 of the sieve drum 2, and the adjoining region 16 of the connecting conduit 7 are separated by a continuous partition 17 from the remainder of the liquid collecting space, together with the remainder of the adjoining connecting conduit space, the partition 17 being taken to a point at which the excess pressure relatively to the solid matter collecting space 10 is largely equalised, practically no pressure drop being between the one and the other side of the gap 12.

The arrangement is such that the adjoining regions 16 and 17 of the connecting conduit 7 between the liquid collecting space 6 and the degasifying device 8 are formed as a diffusor, and the partition 17 is carried always at constant distance from the walls 11 and 18 of the liquid collecting space and of the diffusor. It is favourable if, with the hydrocyclone used as degasifying device, the partition 17 is taken up to the immediate vicinity of the hydrocyclone, so that the liquid rotating there exercises an ejector effect on the gas or air particles present in the space 15, 16.

It is also possible, instead of the partition 17 carried into the connecting conduit 7, to shut off the space 16 at its end 18 and to connect it at that point to the degasifying device by flexible hose or by pipe conduits. This embodiment may be selected when the degasifying device used is not a hydrocyclone but a degasifying chamber connected to a pump.

I claim:

1. In a centrifuge for separating a mixture of solid matter and liquid, of the type including a rotatable sieve drum through which said mixture flows, a collecting space for solid matter discharged from the rear edge of said drum; a collecting space for liquid surrounding said drum, an annular wall encircling the rear edge of the drum and separating said spaces from one another; a device for degasifying said liquid connected to receive liquid from said liquid collecting space, the improvement comprising a partition, transverse to the axis of rotation of the drum and subdividing said liquid collecting space into two regions, said partition extending outward toward said device and forming together with said wall a conduit; means connecting said conduit with said device, the degasifying device creating in said conduit adjacent the surface of the drum a pressure substantially equal to the pressure in said solid matter collecting space.

2. A centrifuging device defined in claim 1, in which the region of said liquid collecting space, confined by said partition and said wall is formed as a diffusor leading to said degasifying device.

3. A centrifuging device defined in claim 1, in which the distance between said partition and said wall is constant.

4. A centrifuging device defined in claim 1, in which said partition is taken directly up to said degasifying device, said degasifying device being a hydrocyclone.

References Cited

UNITED STATES PATENTS 3,268,078 8/1966 Muggli _____ 210—376 X
3,365,066 1/1968 Howell _____ 210—374

OTHER REFERENCES

German printed application 1,097,909, Jan. 19, 1961.

JAMES L. DECESARE, Primary Examiner

U.S. Cl. X.R.
210—376, 378